US008830072B2

(12) United States Patent  
Batra et al.

(10) Patent No.: US 8,830,072 B2  
(45) Date of Patent: Sep. 9, 2014

(54) RF SYSTEMS AND METHODS FOR PROVIDING VISUAL, TACTILE, AND ELECTRONIC INDICATORS OF AN ALARM CONDITION

(75) Inventors: Naresh Batra, Saratoga, CA (US); Lauren Marie Schlicht, Milpitas, CA (US)

(73) Assignee: Intelleflex Corporation, San Jose, CA (US)

( * ) Notice: Subject to any disclaimer, the term of this patent is extended or adjusted under 35 U.S.C. 154(b) by 45 days.

(21) Appl. No.: 11/423,695

(22) Filed: Jun. 12, 2006

(65) Prior Publication Data

US 2007/0285229 A1    Dec. 13, 2007

(51) Int. Cl.  
*G08B 17/00* (2006.01)  
*G08B 25/00* (2006.01)  
*G06K 19/07* (2006.01)  
*G06K 19/077* (2006.01)  
*G08B 13/24* (2006.01)  
*A61J 1/14* (2006.01)

(52) U.S. Cl.  
CPC ........ *G06K 19/07749* (2013.01); *G08B 25/008* (2013.01); *A61J 2205/60* (2013.01); *G06K 19/0717* (2013.01); *G06K 19/07703* (2013.01); *G06K 19/0712* (2013.01); *G08B 13/2457* (2013.01); *G08B 13/2417* (2013.01); *G06K 19/0707* (2013.01); *A61J 1/14* (2013.01); *A61J 2205/70* (2013.01); *A61J 2205/20* (2013.01)  
USPC .... 340/588; 340/572.1; 340/10.1; 340/815.4; 235/375

(58) Field of Classification Search  
USPC ................ 340/572.1–572.9, 588, 10.1, 10.2, 340/10.31, 10.32, 10.34, 10.4, 815.4; 235/375–385  
See application file for complete search history.

(56) References Cited

U.S. PATENT DOCUMENTS

| | | | |
|---|---|---|---|
| 3,417,391 A | 12/1968 | Ando et al. | |
| 4,126,854 A | 11/1978 | Sheridon | 340/373 |
| 4,398,217 A | 8/1983 | Peters | 358/138 |
| 5,257,007 A | 10/1993 | Steil et al. | 340/539 |
| 5,313,848 A | 5/1994 | Santin et al. | 73/866.2 |
| 5,574,430 A * | 11/1996 | Ott et al. | 340/568.2 |
| 5,847,798 A | 12/1998 | Yang et al. | 349/169 |

(Continued)

FOREIGN PATENT DOCUMENTS

| | | | |
|---|---|---|---|
| WO | WO 98/03896 | 1/1998 | G02F 1/133 |
| WO | WO 98/04953 | 2/1998 | G02F 1/1333 |

(Continued)

OTHER PUBLICATIONS

International Search Report arid Written Opinion from PCT Application No. PCT/US07/13182 mailed on Jun. 5, 2008.

(Continued)

*Primary Examiner* — George Bugg  
*Assistant Examiner* — Edny Labbees  
(74) *Attorney, Agent, or Firm* — Zilka-Kotab, PC (57) ABSTRACT

A Radio Frequency Identification (RFID) tag according to one embodiment includes a controller for setting one or more alarm states upon occurrence of one or more alarm conditions, and a visual display device under control of the controller, the visual display device providing a visual, audible, and/or tactile indicator of an alarm condition when an alarm state is set. The visual, audible, and/or tactile indicator of the alarm condition optionally can only be reset by an authorized entity, or cannot be reset.

50 Claims, 6 Drawing Sheets

(56) References Cited

U.S. PATENT DOCUMENTS

| | | | |
|---|---|---|---|
| RE36,200 E | 4/1999 | Berrian et al. | 73/866.2 |
| 6,054,973 A | 4/2000 | Hughes et al. | 345/97 |
| 6,055,091 A | 4/2000 | Sheridon et al. | 359/296 |
| 6,061,107 A | 5/2000 | Yang et al. | 349/86 |
| 6,147,791 A | 11/2000 | Sheridon | 359/296 |
| 6,151,096 A | 11/2000 | McDonnell et al. | 349/188 |
| 6,154,190 A | 11/2000 | Yang et al. | 345/94 |
| 6,198,394 B1 | 3/2001 | Jacobsen et al. | 340/573.1 |
| 6,286,762 B1* | 9/2001 | Reynolds et al. | 235/472.01 |
| 6,300,871 B1 | 10/2001 | Irwin et al. | 340/539 |
| 6,453,737 B2 | 9/2002 | Young et al. | 73/146.5 |
| 6,463,798 B2 | 10/2002 | Niekerk et al. | 73/146.2 |
| 6,507,276 B1 | 1/2003 | Young et al. | 340/447 |
| 6,581,449 B1* | 6/2003 | Brown et al. | 73/146 |
| 6,600,421 B2 | 7/2003 | Freeman | 340/573.1 |
| 6,617,963 B1 | 9/2003 | Watters et al. | 340/10.41 |
| 6,642,016 B1 | 11/2003 | Sjöholm et al. | 435/15 |
| 6,714,133 B2* | 3/2004 | Hum et al. | 340/573.4 |
| 6,717,154 B2 | 4/2004 | Black et al. | 250/393 |
| 6,792,396 B2 | 9/2004 | Inda et al. | 702/188 |
| 6,806,808 B1 | 10/2004 | Watters et al. | 340/10.41 |
| 6,861,954 B2 | 3/2005 | Levin | 340/572.1 |
| 6,879,424 B2 | 4/2005 | Vincent et al. | 359/265 |
| 6,950,028 B2 | 9/2005 | Zweig | 340/588 |
| 7,002,473 B2* | 2/2006 | Glick et al. | 340/572.1 |
| 7,061,380 B1* | 6/2006 | Orlando et al. | 340/572.1 |
| 7,319,397 B2* | 1/2008 | Chung et al. | 340/572.4 |
| 7,667,573 B2* | 2/2010 | Ehrman et al. | 340/10.1 |
| 2002/0040968 A1 | 4/2002 | Black et al. | 250/393 |
| 2002/0067265 A1 | 6/2002 | Rudolph | 340/572.1 |
| 2002/0171081 A1 | 11/2002 | Vincent et al. | 257/40 |
| 2003/0179246 A1 | 9/2003 | Marmaropoulos et al. | 345/811 |
| 2004/0100380 A1 | 5/2004 | Lindsay et al. | 340/540 |
| 2004/0104817 A1* | 6/2004 | Wijk | 340/505 |
| 2004/0124988 A1 | 7/2004 | Leonard et al. | |
| 2004/0201454 A1* | 10/2004 | Waterhouse et al. | 340/10.1 |
| 2004/0201545 A1 | 10/2004 | Yamazaki et al. | 345/1.1 |
| 2004/0209028 A1 | 10/2004 | Gosselin | 428/40.1 |
| 2004/0211840 A1 | 10/2004 | Yogev et al. | 235/491 |
| 2004/0212493 A1 | 10/2004 | Stilp | 340/531 |
| 2004/0212507 A1 | 10/2004 | Zweig | 340/588 |
| 2005/0088299 A1 | 4/2005 | Bandy et al. | 340/539.16 |
| 2005/0134461 A1* | 6/2005 | Gelbman et al. | 340/572.8 |
| 2005/0148828 A1 | 7/2005 | Lindsay | 600/300 |
| 2005/0162277 A1 | 7/2005 | Teplitxky et al. | 340/572.8 |
| 2005/0168325 A1* | 8/2005 | Lievre et al. | 340/10.6 |
| 2005/0211761 A1 | 9/2005 | Anttila et al. | 235/376 |
| 2005/0218218 A1* | 10/2005 | Koster | 235/383 |
| 2005/0248455 A1* | 11/2005 | Pope et al. | 340/539.27 |
| 2006/0077045 A1 | 4/2006 | Chen | 340/10.34 |
| 2006/0244892 A1* | 11/2006 | Asai et al. | 349/151 |
| 2007/0028119 A1* | 2/2007 | Mirho | 713/189 |
| 2007/0109103 A1* | 5/2007 | Jedrey et al. | 340/10.5 |
| 2007/0241902 A1* | 10/2007 | Chang | 340/572.1 |

FOREIGN PATENT DOCUMENTS

| | | | |
|---|---|---|---|
| WO | WO 98/19208 | 5/1998 | G02F 1/167 |
| WO | WO 98/41898 | 9/1998 | G02F 1/167 |
| WO | WO 98/41899 | 9/1998 | G02F 1/167 |
| WO | WO 99/34251 | 7/1999 | G02F 1/1337 |
| WO | WO 00/52671 | 9/2000 | G09G 3/36 |
| WO | WO 2006137035 A2 * | 12/2006 | |

OTHER PUBLICATIONS

International Preliminary Examination Report from PCT Application No. PCT/US07/13182 mailed on Oct. 17, 2008.

Chinese Office Action Summary from application No. 200780016570.8 dated Jul. 12, 2010.

European Search Report from Application No. 07795730.6 dated Aug. 25, 2010.

* cited by examiner

RF SYSTEMS AND METHODS FOR PROVIDING VISUAL, TACTILE, AND ELECTRONIC INDICATORS OF AN ALARM CONDITION

FIELD OF THE INVENTION

The present invention relates to Radio Frequency (RF) systems and methods, and more particularly, this invention relates to Radio Frequency Identification (RFID) systems and methods for providing visual and electronic indicators of an alarm condition.

BACKGROUND OF THE INVENTION

RFID systems are fast becoming the identification medium of choice due to the speed and accuracy with which a user can identify the quantity and type of tagged items present. RFID also holds promise as a medium for gathering information about tagged items and their environments, such as temperature history profiling. However, one major drawback of RFID when used in the supply chain to monitor, for example a temperature history profile of goods in transit, is that the user must have an interrogator present in order to read the temperature history profile. Consider the following.

Many materials in use in commerce, medicine, and other areas are perishable. That is, the materials have a tendency to deteriorate with time, and this tendency to deteriorate is often accelerated by exposure to higher temperatures. This tendency to deteriorate is often designated as a material's "stability". A material that deteriorates slowly in response to higher temperatures over long periods of time is said to have a "high stability". By contrast, a material that deteriorates quickly in response to higher temperatures is said to have a "low stability".

Examples of deterioration includes spoilage in the case of biological materials, loss of potency in the case of drugs, loss of chemical reactivity in the case of chemicals, or alternatively formation of unwanted contaminants, etc. Excessive deterioration eventually results in the material in question being rendered unfit to use, or even rendered dangerous. Thus for commerce, medicine, and other areas, the rapid detection of materials rendered unfit to use by an unacceptable thermal history is very important.

Additionally, there are alternative situations where a material must undergo a certain minimal thermal history before it becomes fit for use. There are many materials, and material treatment processes, commonly used for construction, manufacturing, food preparation, and pharmaceutical preparation, such as concrete setting, epoxy hardening, biological fermentation, cooking, pasteurization, sterilization and the like, where the material needs to be properly cured, incubated, or heat treated before the material is fit to use. Since curing, incubation, or heat treatment processes are often temperature dependent, typically taking longer to proceed at lower temperatures, such materials must undergo a certain minimal time-temperature history before they are fit for use.

As a result, visual time-temperature indicators are widely used in many areas of commerce. These are typically small devices that are affixed to a container of thermally sensitive material. For example, visual time-temperature indicators are often used to verify that a perishable, temperature sensitive product has been transported from the manufacturer to the user via a transport process that has preserved the "cold chain". Here, a "cold chain" means a continuous system for conserving and preserving materials at precise temperature or within a range of temperatures from production to use, so that the integrity of the materials is assured.

One type of time-temperature device relied on a chemical reaction that mimics the degradation of the product to which attached. Another type of time-temperature device merely records the temperature profile for later output, with no other functionality. One drawback of such devices is that such devices may not be reusable. Rather, the device is used once and discarded. This can be expensive. Another drawback of such devices is that the devices are typically not accurate. For example, known visual temperature indicators which are chemically mediated give immediate visual results, but are not particularly accurate. These chemical indicators attempt to mimic the degradation characteristics of a material of interest by finding a different sensor material chemical with complementary degradation characteristics, such that observations of the change in the sensor material correspond to alterations in the material of interest. The drawback of this chemical approach, however, is that most materials of interest, such as biological materials, often may have unique and complex time-temperature profiles. In particular some materials may have time-temperature degradation characteristics that differ profoundly from simple exponential (Arrhenius profile) degradation rates. By contrast, however, there are only a limited number of sensor chemicals that are suitable for visual time-temperature indicators. It is often difficult or impossible to find an exact match, over all temperatures, between the degradation rate of the sensor chemical, and the degradation rate of the material of interest. As a result of these matching problems, the present practice is to be conservative. That is, chemical time-temperature indicators are usually set to degrade more quickly than the material of interest. Although this scenario will insure that the user does not inadvertently accept degraded material, it is inefficient. In many case, material that is, in fact, still good may be inappropriately discarded due to poor time-temperature indicator accuracy. Of course, the alternative scenario, in which the chemical time-temperature indicator fails to adequately warn that the tracked material is degraded, is both unacceptable and potentially dangerous. A further drawback of such devices is that they are prone to tampering. Particularly, unless the device has a unique ID, a device indicating that an adverse condition has occurred can easily be swapped with a new device reflecting no adverse condition. To avoid tampering, the device can be placed inside the packaging of the products to be monitored. However, the device is then not visually accessible until the package is opened.

Another type of non-visual time-temperature device is an RFID tag that records a temperature profile. However, such tags require RFID interrogator to query the tags in order to extract the profile. Thus, a user may not be readily able to analyze the temperature profile unless he or she has an interrogator present. In the past-paced world of supply chain operations, by the time the user is able to scan the tag for the data, he may have already accepted spoiled goods.

There is therefore a need for a device that is capable of providing both a visual or tactile indication of occurrence of a predetermined condition as well as an electronic indication of the occurrence of the condition, and which overcomes the drawbacks mentioned above.

SUMMARY OF THE INVENTION

A Radio Frequency Identification (RFID) tag according to one embodiment includes a controller for setting one or more alarm state upon occurrence of one or more alarm conditions, and a visual display device or other alarm indicator (e.g., audible output device such as a buzzer or speaker outputting a beep, tactile indicator) under control of the controller, the visual display device or other alarm indicator providing a visual, audible, tactile, etc. indicator of the alarm condition when the alarm state is set. The visual or other indicator of the alarm condition can only be reset by an authorized entity, or cannot be reset.

The tag may include a sensor for detecting an environmental condition, the controller setting the alarm state based on an output of the sensor. The sensor may also detect a condition of an object to which attached. Illustrative environmental and/or object conditions include temperature, humidity, Ph, sunlight, ultraviolet light, chemicals, radioactivity, pathogens, presence of bacteria, presence of viruses, presence of prions, carbon dioxide level, and combinations thereof. The alarm condition could also be based on an unauthorized presence of the RFID tag in a restricted area. Other alarm conditions are possible, and those presented here are not to be considered limiting.

The alarm condition can also be based on an exception. Setting the alarm state may include setting an alarm flag, where the alarm flag is one bit or multiple bits.

The visual indicator preferably remain displayed by the visual display device in the absence of power to the visual display device. In other words, the display device based on persistent display technology or a set of flags that enable warning signals.

In some embodiments, the visual display device is an electronic display device. In other embodiments the visual display device is a mechanical display device. The visual display device may also be a tactile display device or multiple sets of warning devices.

In another embodiment, am RFID tag includes a controller for setting an alarm state or multiple alarm states upon occurrence of an alarm condition, and a tactile indicator under control of the controller, the tactile indicator providing a tactile indicator of the alarm condition when the alarm state is set. Preferably, the tactile indicator of the alarm condition can only be reset by an authorized entity.

A method for visually and electronically indicating occurrence of an alarm condition generally includes detecting an alarm condition, setting an alarm state upon detecting the alarm condition, generating a visual indicator of the alarm condition, receiving an electronic query from an RFID interrogator, and transmitting an electronic indication of the alarm condition to the interrogator. The visual indicator of the alarm condition can only be reset by an authorized entity. The tag and/or interrogator may perform various portions of the method. A variation of this method uses an auditory indication instead of a visual indicator.

An RFID system includes a plurality of RFID tags and an RFID interrogator in communication with the RFID tags. Each tag may be coupled to an object, each tag storing information about the object to which coupled. Likewise, each tag may have a unique identifier, the identifier being correlated with information about the object in a database.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and as defined in dictionaries, treatises, etc.

The following description discloses new RFID system and methods for providing a visual or tactile indication of occurrence of a predetermined condition or event.

The use of RFID tags are quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag reader. This coupling is advantageous, as it precludes the need for a direct contact or line of sight connection between the tag and the reader.

Utilizing an RFID tag, an item may be tagged at a period when the initial properties of the item are known. For example, this first tagging of the item may correspond with the beginning of the manufacturing process, or may occur as an item is first packaged for delivery. Electronically tagging the item allows for subsequent electronic exchanges of information between the tagged item and a user, wherein a user may read information stored within the tag and may additionally write information to the tag.

Figure 1:
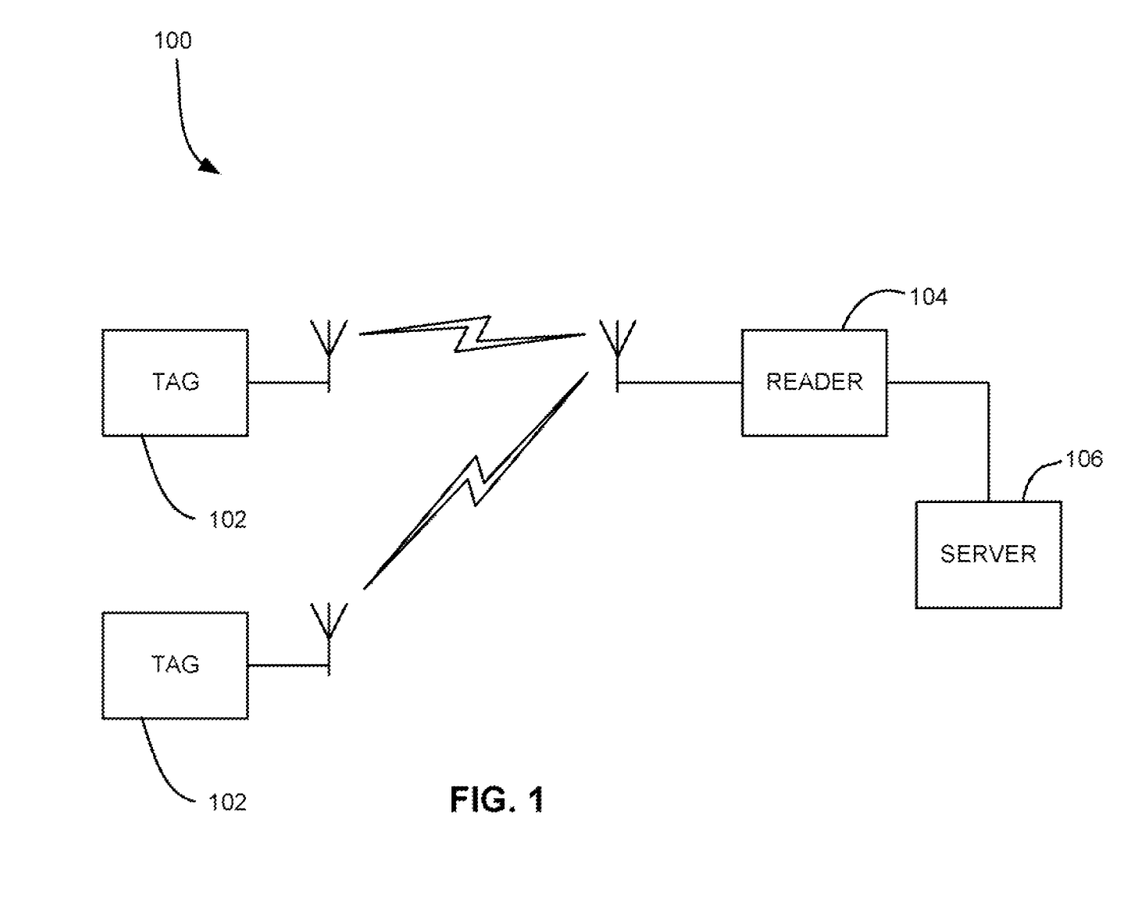
FIG. 1 is a system diagram of an RFID system according to one embodiment of the present invention.

As shown in FIG. 1, an RFID system 100 typically includes RFID tags 102, an interrogator or "reader" 104, and an optional server 106 or other backend system which may include databases containing information relating to RFID tags and/or tagged items. Each tag 102 may be coupled to an object. Each tag 102 includes a chip and an antenna. The chip includes a digital decoder needed to execute the computer commands that the tag 102 receives from the interrogator 104. The chip may also include a power supply circuit to extract and regulate power from the RF interrogator; a detector to decode signals from the interrogator; a backscatter modulator, a transmitter to send data back to the interrogator; anti-collision protocol circuits; and at least enough memory to store its unique identification code, e.g., Electronic Product Code (EPC).

The EPC is a simple, compact identifier that uniquely identifies objects (items, cases, pallets, locations, etc.) in the supply chain. The EPC is built around a basic hierarchical idea that can be uses to express a side variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items, A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific of the Object Class being tagged.

Additional fields may also be used as part of the EPC in order to properly encode and decode information from different numbering systems into their native (human-readable) forms.

Each tag 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

Communication begins with an interrogator 104 sending out signals via radio wave to find a tag 102. When the radio wave hits the tag 102 and the tag 102 recognizes and responds to the interrogator's signal, the interrogator 104 decodes the data programmed into the tag 102. The information is then passed to a server 106 for processing, storage, and/or propagation to another computing device. By tagging a variety of items, information about the nature and location of goods can be known instantly and automatically.

Many RFID systems use reflective or "backscattered" radio frequency (RF) waves to transmit information from the tag 102 to the interrogator 104. Since passive (Class-1 and Class 2) tags get all of their power from the interrogator signal, the tags are only powered when in the beam of the interrogator 104.

The Auto ID Center EPC-Compliant tag classes are set forth below:
Class-1
Identity tags (RF user programmable, range ~3 m)
Lowest cost
Class-2
Memory tags (20 bit address space programmable at ~3 m range)
Security & privacy protection
Low cost
Class-3
Semi-passive tags (also called semi-active tags)
Battery tags (256 bits to 2M words)
Self-Powered Backscatter (internal clock, sensor interface support)
~100 meter range
Moderate cost
Class-4
Active tags
Active transmission (permits tag-speaks-first operating modes)
~30,000 meter range
Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (also known as semi-active or semi-passive), batteries are the most common form of power. This greatly increases read range, and the reliability of tag reads, because the tag does not need power from the interrogator to respond. Class-3 tags only need a 5 mV signal from the interrogator in comparison to the 500 mV that a Class-1 and Class-2 tags typically need to operate. This 100:1 reduction in power requirement along with the reader's ability to sense a very small backscattered signal enables the tag permits Class-3 tags to operate out to a free space distance of 100 meters or more compared with a Class-1 range of only about 3 meters. Note that semi-passive and active tags may also operate in passive mode, using only energy captured from an incoming RF signal to operate and respond.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. High-frequency (860 MHz to 960 MHz and 2.4 GHz to 2.5 GHz) tags offer increased read ranges and high reading speeds. One illustrative application of high frequency tags is automated toll collection on highways and interstates.

Figure 2:
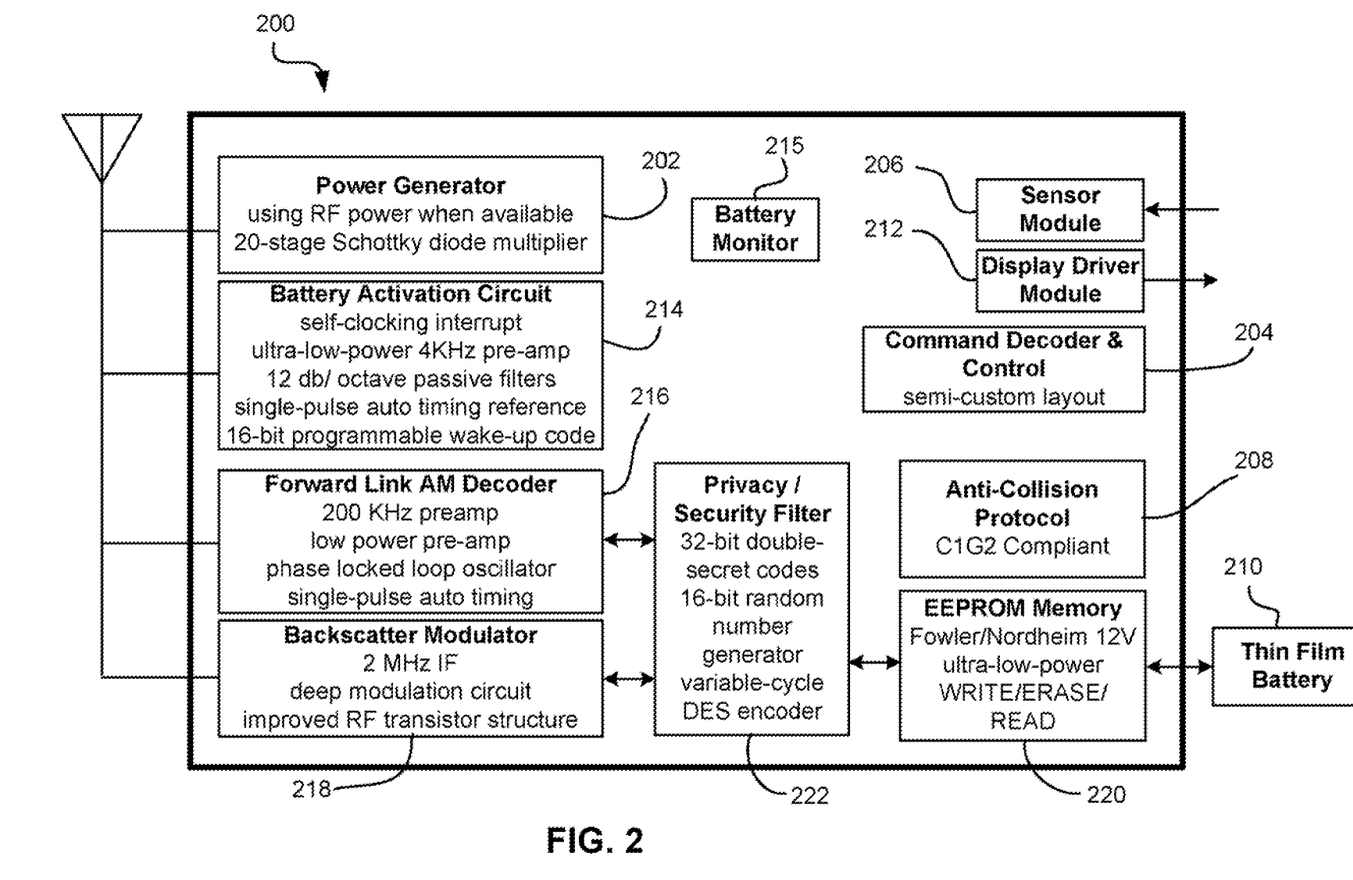
FIG. 2 is a system diagram of an integrated circuit (IC) chip for implementation in an RFID tag according to one embodiment of the present invention.

Embodiments of the present invention are preferably implemented in a Class-3 or higher Class chip. FIG. 2 depicts a circuit layout of a Class-3 chip 200 according to an illustrative embodiment for implementation in an RFID tag. This Class-3 chip can form the core of RFID chips appropriate for many applications such as identification of pallets, cartons, containers, vehicles, or anything where a range of more than 2-3 meters is desired. As shown, the chip 200 includes several industry-standard circuits including a power generation and regulation circuit 202, a digital command decoder and control circuit 204, a sensor interface module 206, a C1G2 interface protocol circuit 208, and a power source (battery) 210. A display driver module 212 can be added to drive a display.

A battery activation circuit 214 is also present to act as a wake-up trigger. In brief, many portions of the chip 200 remain in hibernate state during periods of inactivity. A hibernate state may mean a low power state, or a no power state. The battery activation circuit 214 remains active and processes incoming signals to determine whether any of the signals contain an activate command. If one signal does contain a valid activate command, additional portions of the chip 200 are wakened from the hibernate state, and communication with the interrogator can commence. In one embodiment, the battery activation circuit 214 includes an ultra-low-power, narrow-bandwidth preamplifier with an ultra low power static current drain. The battery activation circuit 214 also includes a self-clocking interrupt circuit and uses an innovative user-programmable digital wake-up code. The battery activation circuit 214 draws less power during its sleeping state and is much better protected against both accidental and malicious false wake-up trigger events that otherwise would lead to pre-mature exhaustion of the Class-3 tag battery 210. While any type of battery activation circuit known in the art can be potentially integrated into the system, an illustrative battery activation circuit 214 is described in copending U.S. patent application Ser. No. 11/007,973 filed Dec. 8, 2004 with title "BATTERY ACTIVATION CIRCUIT", which is herein incorporated by reference.

A battery monitor 215 can be provided to monitor power usage in the device. The information collected can then be used to estimate a useful remaining life of the battery.

A forward link AM decoder 216 uses a simplified phase-lock-loop oscillator that requires an absolute minimum amount of chip area. Preferably, the circuit 216 requires only a minimum string of reference pulses.

A backscatter modulator block 218 preferably increases the backscatter modulation depth to more than 50%.

A memory cell, e.g., EEPROM, is also present. In one embodiment, a pure, Fowler-Nordheim direct-tunneling-through-oxide mechanism 220 is present to reduce both the WRITE and ERASE currents to about 2 µA/cell in the EEPROM memory array. Unlike any RFID tags built to date, this will permit designing of tags to operate at maximum range even when WRITE and ERASE operations are being performed. In other embodiments, the WRITE and ERASE currents may be higher or lower, depending on the type of memory used and its requirements. The memory is preferably present with a capacity sufficient to store several sensor readings and data associated with it such as time, date, etc. as well as provide memory for processing on the chip.

The module 200 may also incorporate a highly-simplified, yet very effective, security encryption circuit 222. Other security schemes, secret handshakes with interrogators, etc. can be used.

Only four connection pads (not shown) are required for the chip 200 to function: Vdd to the battery, ground, plus two antenna leads to support multi-element omni-directional and isotropic antenna. Sensors to monitor temperature, shock, tampering, etc. can be added by appending an industry-standard I²C or SPI interface to the core chip.

It should be kept in mind that the present invention can be implemented using any type of tag, and the circuit 200 described above is presented as only one possible implementation.

Many types of devices can take advantage of the embodiments disclosed herein, including but not limited to RFID systems and other wireless devices/systems. To provide a context, and to aid in understanding the embodiments of the invention, much of the present description shall be presented in terms of an RFID system such as that shown in FIG. 1. It should be kept in mind that this is done by way of example only, and the invention is not to be limited to RFID systems, as one skilled in the art will appreciate how to implement the teachings herein into electronics devices in hardware and/or software. In other words, the invention can be implemented entirely in hardware, entirely in software, or a combination of the two. Examples of hardware include Application Specific Integrated Circuits (ASICs), printed circuits, monolithic circuits, reconfigurable hardware such as Field Programmable Gate Arrays (FPGAs), etc. The invention can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, nonvolatile memory device, etc.

A computer for storing and/or executing the code and/or performing the processes described herein can be any type of computing device, including a personal computer (PC), laptop PC, handheld device (e.g., personal digital assistant (PDA)), portable telephone, etc.

As mentioned above, RFID tags may be coupled to objects, each tag being associated with and optionally storing information about the object to which coupled. A tagged object can be identified and located by identifying and locating the tag coupled to it.

The following description will describe embodiments of the present invention that provide a visual, audible, and/or tactile indication of an alarm condition created by occurrence of an event, such as exceeding a predefined environmental condition, occurrence of an exception condition, etc.. In this way, the user can quickly verify that a predefined event has or has not occurred, without requiring the user to have electronic equipment present to electronically read the device. For ease of understanding, much of the following description will be presented in terms of visual and tactile indicators. It should be understood that the visual display device or tactile device can easily be replaced with an audible output device in any of the various possible combinations and permutations of the present invention. An audible output device can be any type of audible output device known in the art, such as a buzzer, speaker outputting a beep, etc. The audible device may provide similar functionality as the visual or tactile device, such as persistent output until reset, etc. Also, variations of the present invention may include combinations of the various types of output/indicator devices, multiples of the same type of output device, etc.

Figure 3:
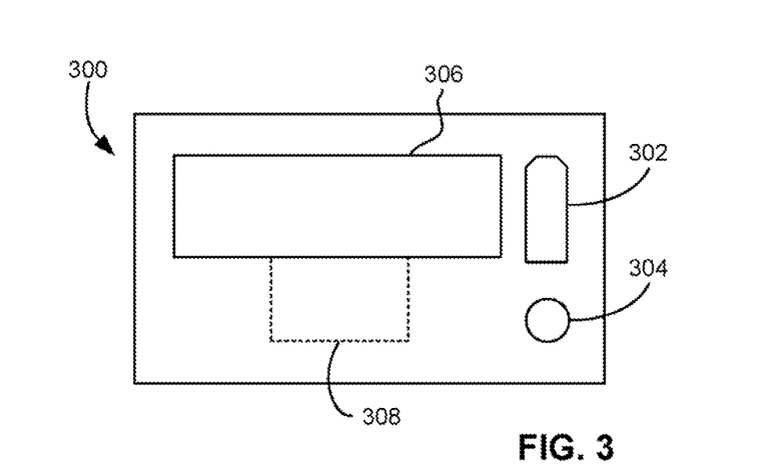
FIG. 3 is a side view of an RFID tag with a display device and sensor capability according to one embodiment of the present invention.

FIG. 3 illustrates a semi-passive (or active) RFID tag 300 with display device and sensor capability such that an environmental condition-based alarm condition is signaled by a single bit or multiple bits that trigger a change in color of a color stripe, thereby providing a visual indication that the alarm condition has occurred. As shown, the tag 300 includes one or more sensors 302, 304 for detecting one or more environmental conditions. The tag 300 also includes a visual display device 306.

Upon the tag 300 detecting an alarm condition based on sensor output, the visual display device 306 is instructed or engaged to display a visual indicator of the alarm condition. For example, a visual indicator can be a simple color change, the placement of a symbol such as a circle or triangle, or can include a number of textual or graphical representations.

The tag 300 can be attached to an item utilizing numerous mechanism. For example, conventional mechanical fastening system, loop and hook-type arrangements, stitches, adhesives, as well as other known fixation techniques may be employed to permanently or temporarily attach the tag 300 to an item. The tag 300 can also be integrally formed with the item, or can be used as a stand alone device.

The sensors 302, 304 monitor the external environment in which the tag 300 is operating. Virtually any environmental condition can be monitored. Illustrative sensors monitor temperature, humidity, Ph, sunlight, ultraviolet light, chemicals, radioactivity, pathogens, bacteria, viruses, prions, carbon dioxide level, etc. in the environment surrounding the tag 300. Alarm conditions can be based on exceeding levels or quantities, such as passing a threshold high temperature, falling below a threshold low temperature, or detecting a certain number of viruses. Alarm conditions can also be based on historic data, such as a number of hours that the carbon dioxide level was above a threshold. For example, in one embodiment an internal or external temperature sensor can be employed so that in the event that the tag 300 experiences a period below freezing, a visual indicator on the visual display 306 will be on display to a user, who can quickly ascertain that an alarm condition has occurred.

One or more of the sensors can also monitor a condition, e.g., characteristic or property, of the item to which attached, as opposed to an environmental condition. One example includes monitoring a surface temperature of the object to which attached.

The sensors 302, 304 may take readings continuously, or may take readings at some interval, such as every 5 minutes, every 15 minutes, every day, etc. The tag may enter hibernate state during the interval period between readings to conserve battery power.

A controller 308 on the tag is coupled to the sensors 302, 304 and sets an alarm state based on output from one (or more) of the sensors. The controller 308 controls the activation of the visual display device 306 upon detecting the alarm condition. Examples of operation will be provided below. The controller 308 may include one or more silicon chips programmable microcontrollers or discrete components. The controller can set alarm flags to indicate the alarm conditions. Preferably an alarm flag is one bit stored in memory on the tag, or may be multiple bits stored in the memory. For a one-bit alarm flag, a logic zero indicates a normal condition, while a logic one indicates an active alarm state (or vice versa). The flag or set of flags preferably remains set until reset by an authorized entity.

The visual indicator of the visual display device 306 remains present on the visual display device 306 either permanently, or until the tag receives an instruction to revert to a non-alarm state from an authorized entity. An authorized entity may be the end recipient of goods previously in transit, a system administrator, a security sevice, a computerized system, etc. Validation of the authorized entity by the tag 300 can be based on receipt of a password or secret code for example. By only allowing an authorized entity to disengage the alarm state, tampering with the tag is prevented. Also, because the ID of the tag is known and associated with a certain object, the tag cannot merely be replaced with another tag not displaying the alarm condition visual indicator. Accordingly, upon a tagged item arriving at its destination, the tag may be scanned to verify its identify, e.g., by comparing the tags EPC to the EPC shown on a shipping order.

The visual display device 306 can be any type of display device, Illustrative visual display devices include color-changing strips, electrophoretic displays, eletrokinetic displays, light emitting diodes (LEDs), liquid crystal displays (LCDs), etc. One practicing the invention will understand that the type of visual display device 306 used will depend on the power supply to the tag. If the tag has a virtually unlimited power supply, e.g., is coupled to a vehicle battery, then visual display devices using higher power may be used. If the tag has a limited power supply, e.g., onboard battery, low power visual display devices such as state changing electrochemical strips are preferred.

In preferred embodiments, the visual display device 306 is an ultra-low power display device, so as to use as little battery power as possible and thereby maximize the active life of the tag 300 (the tag may remain useful as a passive tag after the battery is expended). The visual display device 306 is preferably one that continues to display the visual indicator even after power to the display device is removed. This minimized power consumption, which is of particular importance for RFID tags of limited battery life. A preferred visual display device 306 includes a chemical strip that changes color upon receiving an electrical signal from the controller 308. The color change is permanent until reset electronically by the controller 308, and does not require a continuous electric current to maintain the color change.

The display media of the visual display device 306 can be a bi-stable, non-volatile display medium. Examples of bi-stable non-volatile mediums include but are not limited to encapsulated and un-encapsulated electrophoretic material, Cholesteric materials, polymer dispersed cholesteric liquid crystals (PDChLC), encapsulated cholesteric materials, separated redox and dye reaction materials such as Dow Commotion® display medium, ph sensitive dyes, electrothermochromics displays and thermo-chromic, zenithal bi-stable, nematic, and surface stabilized ferroelectric liquid crystals.

The display media can further comprise electronic ink, wherein the electronic ink is capable of displaying a graphical indicator on the electronic label. The term "electronic ink" as used herein is intended to include any suitable bi-stable, non-volatile material. The term "bi-stable" as used herein is intended to indicate that the particles of the imaging material can alternately occupy two stable states. For example, the particles corresponding to different pixel locations of the display assembly can alternately occupy an ON or an OFF state to form selected indicia.

In an illustrative embodiment, the display media is reflective to provide a greater viewing angle to the image displayed by the electronic label. In this case, the particles in the imaging material can be oriented in a first state to reflect light (ON) or a second state to absorb light (OFF). The term "non-volatile" as used herein is intended to denote that the imaging material has indefinite memory without power and will retain an image in the absence of power to the visual display device 306. The particles in the imaging material maintain a first state unless actively directed to change to a second state. Thus, the imaging surface of the label shows a high-quality image even when power to the visual display device 306 is turned off. The electronic ink can also be a printable, conductive ink having an arrangement of particles or microscopic containers or microcapsules. Each microcapsule has disposed therein an electrophoretic composition of a fluid, such as a dielectric or emulsion fluid, and a suspension of colored or charged particles or colloidal material. The diameter of the microcapsules typically ranges from about 30 to about 300 microns.

According to one practice, the particles visually contrast with the dielectric fluid. According to another example, the electronic ink can include rotatable balls that can rotate to expose a different colored surface area, and which can migrate between a forward viewing position and/or a rear non-viewing position, or both. On example of such a material is a gyricon. Gyricon is a material comprised of twisting rotating elements contained in liquid-filled spherical cavities and embedded in an elastomer medium. The rotating elements can be made to exhibit changes in optical properties by the imposition of an external electric field. Upon application of an electric field of a given polarity, one segment of a rotating element rotates toward, and is visible by an observer of the display. Application of an electric field of opposite polarity, causes the element to rotate and expose a second, different segment to the observer. A gyricon display maintains a given configuration until an electric field is actively applied to the display assembly. Gyricon particles typically have a diameter of about 100 microns. Gyricon materials are disclosed in U.S. Pat. Nos. 6,147,791, 4,126,854 and 6,055,091, the contents of which are herein incorporated by reference.

A reference electrode layer can be used in conjunction with the electronic ink disposed upon a display medium and a backplane to form an electronically activatable and addressable electronic display. The electrode and backplane can be disposed on, or cover opposite sides of the microcapsule arrangement, or both to provide structure for creating a potential difference across the electronic ink that causes particles within the microcapsules to migrate toward one of the electrodes. This migration can change the color of the sphere, and hence the pixel location, as viewed by an individual. According to one practice, the microcapsules can be filled with electrically charged white particles in a black or colored dye. Examples of electronic ink and methods of fabricating assemblies capable of controlling or effecting the orientation of the ink suitable for use with the present invention are set forth in International Patent Application Publication Number WO 98/41899, International Patent Application Publication Number WO 98/19208, International Patent Application Publication Number WO 98/03896, and International Patent Application Publication Number WO 98/41898, the contents of which are herein incorporated by reference.

The term electronic ink can also include a bi-stable non-volatile cholesteric imaging material. The cholesteric liquid crystal material has positive dielectric anisotropy and can include a chiral material in an amount effective to form focal conic and twisted planar textures. Typically cholesteric imaging material comprises liquid crystal cells ranging in thickness from about 25 microns to about 50 microns. Suitable cholesteric materials are disclosed for example in U.S. Pat. Nos. 6,154,190, 6,061,107 and 5,847,798, the contents of which are incorporated herein by reference.

In addition, the electronic ink can include zenithal bi-stable display technology to form the bi-stable nonvolatile display assembly comprised of a bi-stable nematic liquid crystal device cell. The bi-stable nematic cell is provided with a surface alignment grating on at least one cell wall and a surface treatment on an opposite cell wall. The material is activated by DC pulses to form an image. Suitable zenithal bi-stable devices are disclosed in U.S. Pat No. 6,151,096, International Patent Application Publication Number WO 98/04953, International Patent Application Publication Number WO 99/34251A1, U.S. Pat. No. 6,054,973, International Patent Application Publication Number WO 00/52671, and U.S. Pat. No. 6,151,096, the contents of which are herein incorporated by reference.

Further, the electronic ink can include a thermo-chromic material. A thermo-chromic material is capable of changing its state alternately between transparent and opaque upon the application of heat. In this manner, a thermo-chromic imaging material develops images through the application of heat at specific pixel locations in order to form an image. The thermo-chromic imaging material retains a particular image until heat is again applied to the material. The display assembly is reusable, rewritable, non-volatile, bi-stable. Visually, black characters are written in a transparent background by applying heat to selected locations or pixels in the display layer. To form color displays other colors, such as red, yellow, and blue are used. Since the rewritable material is transparent, UV fluorescent printings, designs and patterns underneath can be seen through.

The electronic ink can also include surface stabilized ferroelectric liquid crystals (SSFLC). Surface stabilized ferroelectric liquid crystals confining ferroelectric liquid crystal material between closely-spaced glass plates to suppress the natural helix configuration of the crystals. The cells switch rapidly between two optically distinct, stable states simply by alternating the sign of an applied electric field.

Magnetic particles suspended in an emulsion comprise an additional imaging material suitable for use with the present invention. Application of a magnetic force alters pixels formed with the magnetic particles in order to create, update or change human readable indicia, machine readable indicia or both. Those skilled in the art will recognize that a variety of bi-stable non-volatile imaging materials are available and may be implemented in the present invention.

The RFID tag 300 of FIG. 3 and other embodiments disclosed herein may include other features, such as data logging, etc.

Figure 4:
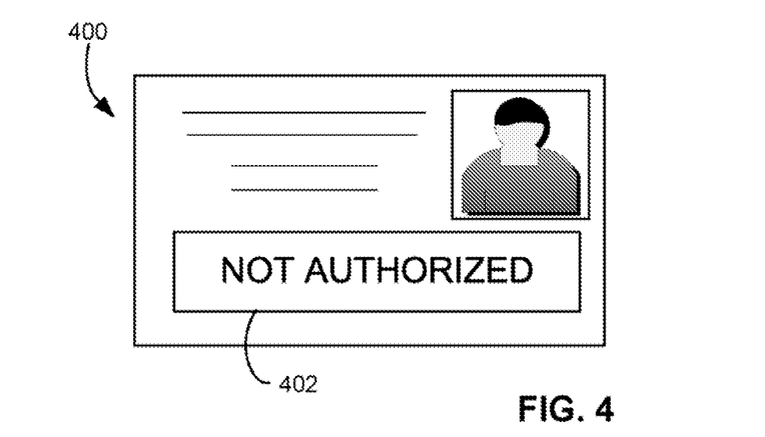
FIG. 4 is a side view of an RFID tag with a display device according to one embodiment of the present invention.

FIG. 4 illustrates a tag 400 that sets an alarm state upon detecting an exception. The tag 400 includes a visual display device 402. Upon the tag 400 detecting an exception-based alarm condition, an alarm state is set and the visual display device 402 is instructed or engaged to display a visual indicator of the alarm condition. For example, if the tag goes out of range of the reader, the lack of incoming signal creates an exception and the alarm state is set. Similarly, if the tag realizes it has passed by reader without being detected (e.g., was shielded but now detects a signal), an alarm state can be set.

Figure 5A:
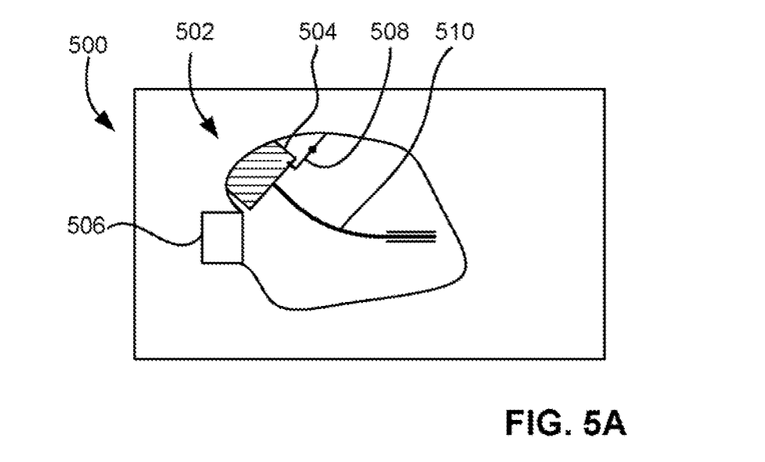
FIG. 5A is a partial breakaway view of an RFID tag with a mechanical display device according to one embodiment of the present invention.
Figure 5B:
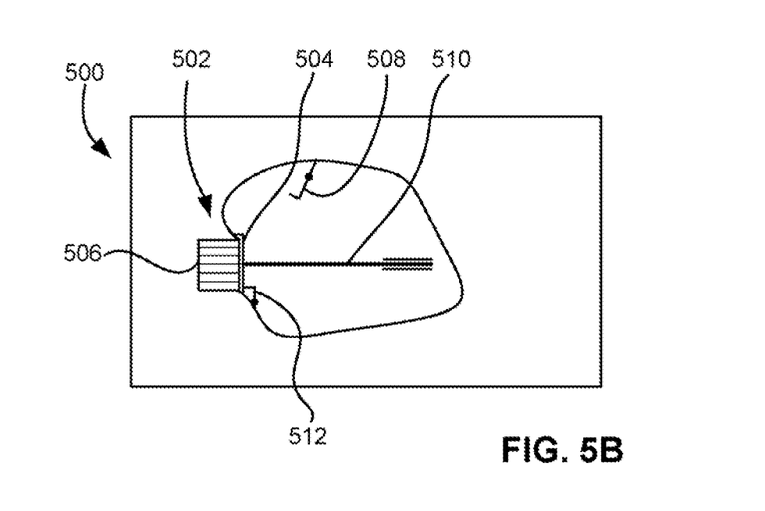
FIG. 5B is a partial breakaway view of an RFID tag with a mechanical display device indicating an alarm condition according to one embodiment of the present invention.

The visual display device may also include a mechanical device, which may include some electronic components but has a mechanical aspect. FIGS. 5A-5B illustrate a tag 500 where the visual display device 502 includes a mechanical flag 504. In the non-alarm state, shown in FIG. 5A, the mechanical flag 504 is retracted so that a particular color is shown in the window 506. As shown in FIG. 5B, when the alarm flag is set, a trigger 508 releases the flag 504, which is carried into the window 506 via spring 510. The flag 504 changes the color viewed through the window. Preferably, the flag 504 can be technically reset, e.g., by insertion of a tool through an opening, etc. To avoid tampering, the trigger 508 can remain retracted until the tag 500 is instructed to actuate the trigger 508. To further avoid tampering, the flag 504 may lock into place upon being released. A lock 512 may be provided for this purpose and may or may not be selectively releasable.

Figure 6:
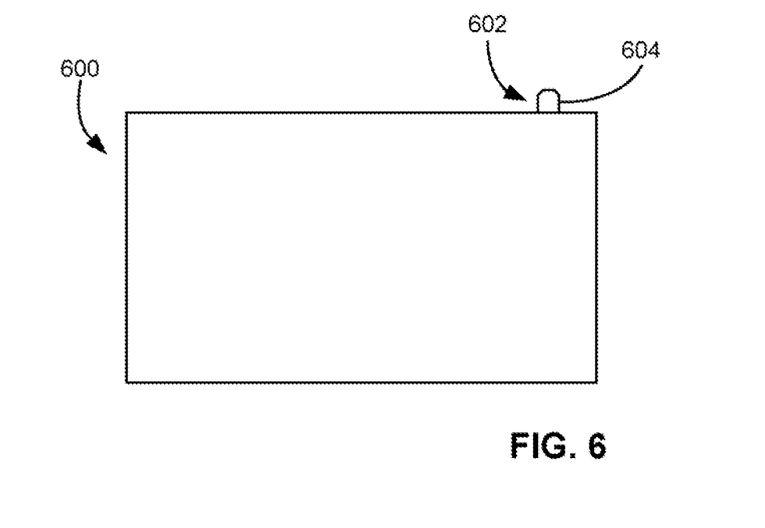
FIG. 6 is a side view of an RFID tag with a tactile indicator device indicating an alarm condition according to one embodiment of the present invention.

FIG. 6 illustrates a tag 600 having a tactile indicator 602 that indicated an alarm condition. The tactile indicator 602 in this embodiment includes a button 604 that pops out of the tag. The button 604 can then be felt by a user. The button 604 may also be visible, and may have a color different than that of the tag housing. The tactile indicator 602 may include a trigger and spring mechanism similar to that used in the illustrative tag 500 of FIGS. 5A-5B. Embodiments with tactile indicators are particularly useful for monitoring items or conditions where a direct line of sight to the tag is difficult, such as between boxes of goods, under pallets, inside pipes, etc. Note that the tactile indicator can be provided in addition to a visual display device, or can replace it.

In additional embodiments, the alarm state is set by an interrogator upon the interrogator detecting an alarm condition, e.g., upon occurrence of some event. For example, if the interrogator detects an unauthorized ID badge, it may instruct that badge to set the alarm condition. In another embodiment, the interrogator sets an alarm state in each tag as it identifies each tag to indicate which tags have been read, are from a certain lot, are coupled to objects to be identified, etc.

Figure 7:
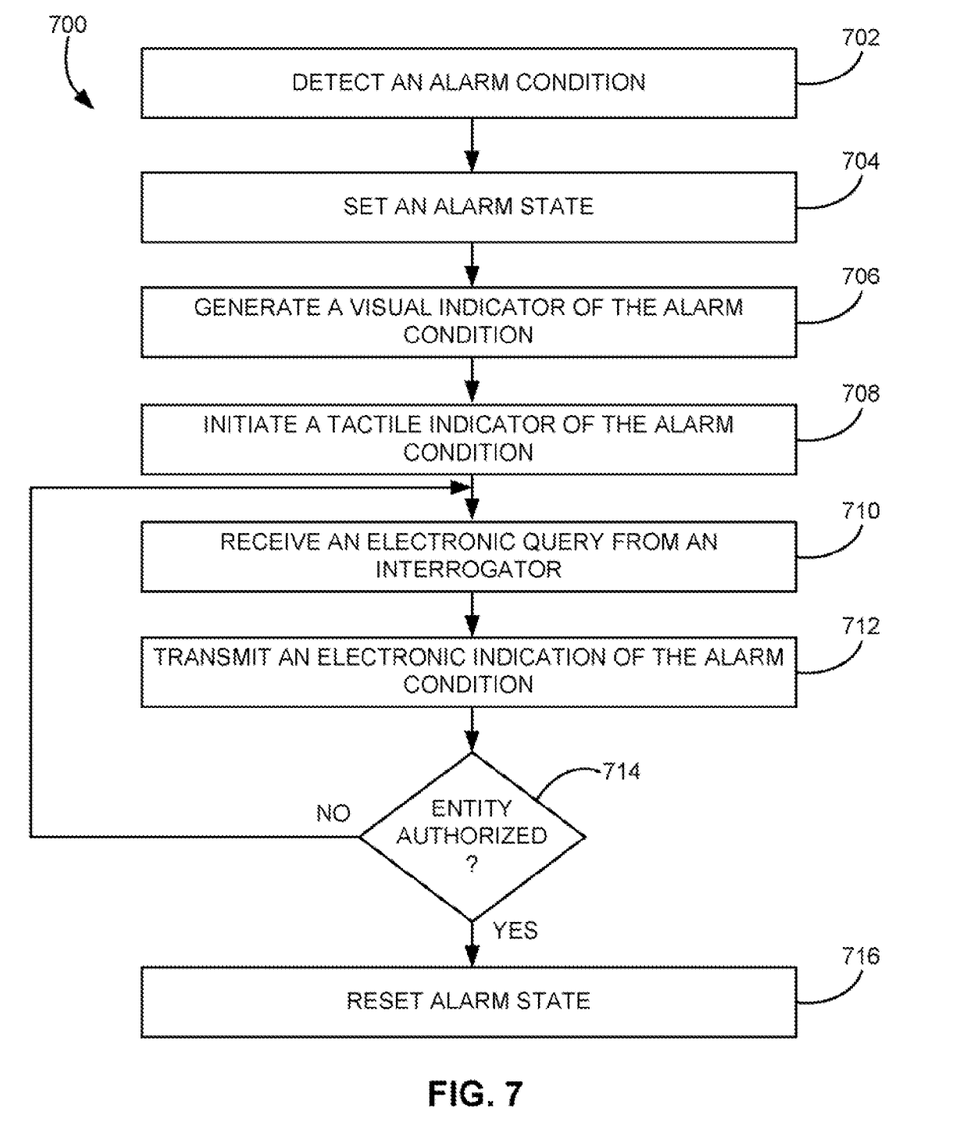
FIG. 7 is a process diagram of a method for visually and electronically indicating occurrence of an alarm condition according to one embodiment of the present invention.

FIG. 7 graphically depicts an illustrative method 700 for visually and electronically indicating occurrence of an alarm condition. In operation 702, an alarm condition is detected. This operation may be performed by the tag, the interrogator, or both. An alarm state is set upon detecting the alarm condition in operation 704. In operation 706, a visual indicator of the alarm condition is generated. In optional or alternative operation 708, a tactile indicator is also initiated. At this point, a user can see or feel that an alarm condition has occurred or is occurring.

In operation 710, an electronic query is received from an RFID interrogator. An electronic indication of the alarm condition is transmitted to the interrogator in operation 712. The visual and/or tactile indicator of the alarm condition can only be reset by an authorized entity. Accordingly, in operation 714, authorization of the entity is verified. If the entity is authorized, the alarm state is reset in operation 716. The indicator may then reflect or be reset to a non-alarm condition. If the entity is not authorized, the alarm state is not reset and the visual and/or tactile indicator remain in the alarm state.

In variation, the tag may also transmit the electronic indication of the alarm condition to the interrogator without having first received a query from the interrogator.

Figure 8:
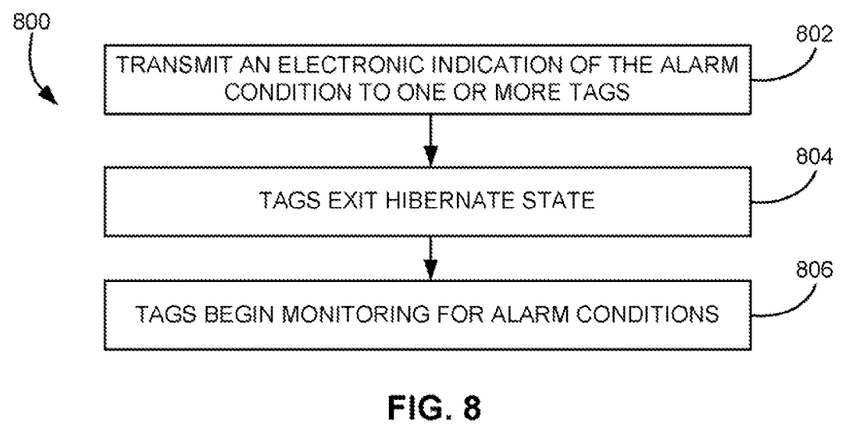
FIG. 8 is a process diagram of a method for activating one or more RFID tags upon occurrence of an alarm condition according to one embodiment of the present invention.

FIG. 8 depicts a method 800 for activation other RFID tags on occurrence of an alarm condition. In operation 802, a master tag transmits an electronic indication of an alarm condition to one or more other tags. This transmission may include an activate command to bring the other tags out of a hibernate state. The transmission may include a simple instruction to begin monitoring. The transmission may also include the nature of the alarm condition, as well as parameters for detecting alarm conditions by the various other tags. In operation 804, the other tags(s) come out of a hibernate state, and in operation 806, begin monitoring for an alarm condition (which may or may not be the same as the first alarm condition). Note that a transmission is meant to include a series of transmissions between the tags, with possible transmissions to and from an interrogator. For example, in a variation, the master tag might transmit the indicator of the alarm condition to the interrogator, and the interrogator wakes the other tags. Also, the master tag and/or other tags may or may not have a visual display device or tactile device thereon.

To place the various aspects of the invention in context, several nonlimiting examples are provided below.

Example:
A tag is coupled to a case of frozen meat. The tag includes a temperature sensor and an alarm as described herein. During shipment of the meat, the tag records a temperature profile of the temperature in the case. Readings can be taken at any desired interval from seconds to days, e.g., every 15 minutes, every hour, every three hours, etc. The frequency, of course, may depend on user preference, the sensitivity of the item(s) being monitored, the susceptibility to temperature change, etc. For example, frozen goods temperature does not change very rapidly in a dense and packed environment, and so longer intervals may be suitable.

Continuing with the example, if the temperature goes outside a preset range, such as above a maximum temperature or below a certain temperature to prevent thawing or freezer burn and hence guarantee good quality of meat, a flag is set and the visual alarm is engaged. The visual indicator allows people to quickly verify whether the goods have been damaged without requiring that a tag reader be present. If the temperature of the case of meat has exceeded the maximum value, the visual alarm will indicate that the recipient should reject the meat, or at least review the temperature profile stored on the tag prior to accepting the product.

Example:
A blood bag is being transported from a blood bank to a hospital. A tag is attached to the blood bag, and programmed to set an alarm state if the blood bag exceeds 50 degrees F. for a period of 5 minutes. If the blood bag exceeds 50 degrees F., a stripe on the tag changes color from blank to red. "Blank" refers to a default color and can be any color. For the present description, assume blank is black. The visual indicator allows people to quickly verify whether the blood has been damaged without requiring that a tag reader be present.

Example:
A rack of wine is stored in a cellar. A tag is attached to the rack of wine, and programmed to set an alarm state if the UV light in the cellar reaches a cumulative amount since the tag was placed e.g., 5 million photons. If the cellar exceeds the threshold, the alarm condition flag is set and a visual indicator is displayed, e.g., a stripe on the tag changes color from green to red.

Example:
Assume three people pass into a restricted area. Person A is authorized to enter the restricted area and is wearing his ID tag clipped to his shirt, person B is not authorized to enter the restricted area and is wearing her ID tag clipped to her shirt, and person C is not authorized to enter the restricted area and has placed her ID tag in a metal container to shield it from the reader. All of the ID tags are normally blank, revert to blank after a certain time has elapsed, or revert to blank upon receiving an authorized instruction to do so. When person A passes through the entry door, the reader at the door verifies the tag identity as being associated with an authorized user and instructs person A's ID tag to show a green stripe. When person B passes through the entry door, the reader recognizes the unauthorized entry and instructs her ID tag to show a red stripe. When person C passes through the entry door, the reader does not detect the shielded tag. Person C's tag thus remains blank. By looking at each person's ID tag, a security guard area and can take appropriate action. Because person C's tag is blank, the guard may not know whether the ID tag is defective or has been shielded. The guard can then either scan the ID tag with a portable reader, or escort person C back to the entry for rescanning. Likewise, when person B leaves the area, the red stripe may remain, requiring person B to notify security in order to reset the stripe, and explain her unauthorized entry.

Example:
During a read process, the tags that have been read are set to the alarm state and so display a visual indicator. Those not yet read do not display a visual indicator.

Example:
A tag having a moisture sensor and a tactile indicator is coupled to the underside of a wood pallet. The pallet is then located with cases of products. The tag is programmed to set an alarm state if the moisture sensor gets wet. When water is splashed on or rises to the level of the moisture sensor, the alarm flag is set and the tactile indicator extends from the tag. A user reaches under the pallet and touches the tag to feel if the tactile indicator is extended. If so, at least the bottom of the pallet was in contact with water.

Example:
A master tag having a temperature sensor is placed on the outside of a pallet stacked with goods. Tags having temperature sensors are coupled to cases of items on the pallet. The master tag is programmed to set an alarm state if the ambient temperature exceeds a threshold. When temperature exceeds the threshold, the master tag alarm flag is set and an activate command is sent to the tags on the pallet. The tags wake up and begin monitoring a temperature profile of the object to which attached or its environment.

One skilled in the art will appreciate how the system and methods presented herein can be applied to a plethora of scenarios, venues and goods. Accordingly, if should be understood that the systems and methods disclosed herein may be used with objects of any type and quantity in virtually any location.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A Radio Frequency Identification (RFID) tag, comprising:
   an activation circuit for waking the RFID tag from a low power hibernate state;
   a controller for setting an alarm state upon occurrence of an alarm condition;
   a visual display device under control of the controller, the visual display device providing a visual indicator of the alarm condition when the alarm state is set; and
   a non-volatile memory for storing indications of multiple alarm states and time data associated with the indications of the alarm states,
   wherein the visual indicator of the alarm condition can only be reset by an authorized entity.

2. An RFID tag as recited in claim 1, further comprising a sensor for detecting an environmental condition or a condition of an object to which attached, the controller setting the alarm state based on an output of the sensor, wherein the RFID tag enters the hibernate state between taking readings of the sensor, wherein readings from the sensor are stored in the non-volatile memory.

3. An RFID tag as recited in claim 2, wherein the environmental condition is selected from a group consisting of temperature, humidity, Ph, sunlight, ultraviolet light, chemicals, radioactivity, pathogens, presence of bacteria, presence of viruses, presence of prions, carbon dioxide level, and combinations thereof.

4. An RFID tag as recited in claim 1, wherein the alarm condition is based on an amount of time that a sensor reading or readings surpass a threshold.

5. An RFID tag as recited in claim 1, wherein setting the alarm state includes setting an alarm flag, wherein the alarm flag is one or more bits stored in a memory of the RFID tag.

6. An RFID tag as recited in claim 1, wherein the visual indicator remains displayed by the visual display device in the absence of power to the visual display device.

7. An RFID tag as recited in claim 1, wherein the alarm condition is an exception.

8. An RFID tag as recited in claim 1, wherein the alarm state is set if the RFID tag goes out of range of an RFID interrogator or defined set of interrogators.

9. An RFID tag as recited in claim 1, wherein the alarm state is set if the RFID tag determines that it was not detected by an RFD interrogator.

10. An RFID tag as recited in claim 1, wherein the visual display device includes at least one of an electronic display device, a mechanical display device, and a tactile display device.

11. An RFID tag as recited in claim 1, wherein the alarm condition is based on a presence of the RFID tag in a defined area as determined by the tag.

12. An RFID tag as recited in claim 1, wherein multiple alarm states are set upon detecting multiple alarm conditions.

13. An RFID tag as recited in claim 1, further comprising a sensor and non-volatile memory, wherein the nm-volatile memory has sufficient capacity to store several sensor readings.

14. An RFID tag as recited in claim 1, wherein the alarm condition is based on historical data rather than instantaneous data.

15. A Radio Frequency Identification (RFID) system, comprising:
   a plurality of RFID tags as recited in claim 1; and
   an RFID interrogator in communication with the RFID tags.

16. An RFID tag as recited in claim 1, wherein the tag communicates with a remote device via radio frequency signals at a frequency of 860-960 MHz and/or 2.4 GHz to 2.5 GHz.

17. An RFID tag as recited in claim 16, further comprising a sensor for detecting an environmental condition or a condition of an Object to which attached, the controller setting the alarm state based on an output of the sensor, wherein the RFID tag enters the hibernate state between taking readings of the sensor, wherein readings from the sensor are stored in the non-volatile memory; wherein multiple alarm states are set upon detecting multiple alarm conditions; wherein at least one of the alarm conditions is based on historical data rather than instantaneous data.

18. A Radio Frequency Identification (RFID) tag comprising:
   a controller of the RFID tag for setting an alarm state upon occurrence of an alarm condition;
   a visual display device under control of the controller, the visual display device providing A visual indicator of the alarm condition when the alarm state is set, wherein the visual indicator of the alarm condition cannot be rest.

19. An RFID tag as recited in claim 18, further comprising a sensor for detecting an environmental condition or a condition of an object to which attached, the controller setting the alarm state based on an output of the sensor, wherein the visual indicator of the alarm condition cannot be reset by any entity.

20. An RFID tag as recited in claim 19, wherein the environmental condition is selected from a group consisting of temperature, humidity, Ph, sunlight, ultraviolet light, chemicals, radioactivity, pathogens, presence of bacteria, presence of viruses, presence of prions, carbon dioxide level, and combinations thereof, wherein the alarm condition is based on a temporal amount of time that a sensor reading or readings surpass a threshold.

21. An RFID tag as recited in claim 18, further comprising an activation circuit for waking the RFID tag from a low power hibernate state.

22. An RFID tag as recited in claim 18, wherein setting the alarm state includes setting an alarm flag, wherein the alarm flag is one or more bits stored in a memory of the RIAD tag.

23. An RFID tag as recited in claim 18, wherein the visual indicator remains displayed by the visual display device in the absence of power to the visual display device.

24. An RFID tag as recited in claim 18, further comprising a non-volatile memory for storing indications of multiple alarm states wherein the non-volatile memory also stores time data associated with the indications of the alarm states.

25. An RFID tag as recited in claim 18, wherein the alarm state is set if the RFID tag goes out of range of an RFID interrogator or defined set of interrogators.

26. An RFID tag as recited in claim 18, wherein the alarm state is set if the RFID tag determines that it was not detected by an RFID interrogator.

27. An RFD tag as recited in claim 18, wherein the visual display device includes at least one of an electronic display device, a mechanical display device, and a tactile display device.

28. An RFID tag as recited in claim 18, wherein the alarm condition is based on a presence of the RFID tag in a defined area as determined by the tag.

29. An RFID tag as recited in claim 18, wherein multiple alarm states are set upon detecting multiple alarm conditions.

30. A Radio Frequency Identification (RFID) system, comprising:
a plurality of RFID tags as recited in claim 18; and
an RFID interrogator in communication with the RFID tags.

31. An RFID tag as recited in claim 18, wherein the tag communicates with a remote device via radio frequency signals at a frequency of 860-960 MHz and/or 2.4 GHz to 2.5 GHz.

32. An RFID tag as recited in claim 31, further comprising a sensor for detecting an environmental condition or a condition of an Object to which attached, the controller setting the alarm state based on an output of the sensor, wherein the RFID tag enters the hibernate state between taking readings of the sensor, wherein readings from the sensor are stored in the non-volatile memory; wherein multiple alarm states are set upon detecting multiple alarm conditions; wherein at least one of the alarm conditions is based on historical data rather than instantaneous data.

33. An RFID tag as recited in claim 1, wherein the controller is configured to set multiple alarm states upon detecting multiple alarm conditions, wherein at least one of the alarm conditions is based on a temporal amount of time that output or outputs of the sensor surpass a threshold, wherein at least another of the alarm conditions is based on historical data rather than instantaneous data.

34. An RFID tag as recited in claim 33, further comprising a sensor for detecting an environmental condition or a condition of an object to which attached, the controller setting the alarm state based on an output of the sensor, wherein the RFID tag enters the hibernate state between taking readings of the sensor, wherein readings from. the sensor are stored in the non-volatile memory; wherein multiple alarm states are set upon detecting multiple alarm conditions; wherein at least one of the alarm conditions is based on historical data rather than instantaneous data.

35. An RFID tag as recited in claim 18, wherein the controller is configured to set multiple alarm states upon detecting multiple alarm conditions, wherein at least one of the alarm conditions is based on a temporal amount of time that output or outputs of the sensor surpass a threshold, wherein at least another of the alarm conditions is based on historical data rather than instantaneous data.

36. An RFD tag as recited in claim 35, further comprising a sensor for detecting an environmental condition or a condition of an object to which attached, the controller setting the alarm state based on an output of the sensor, wherein the RFID tag enters the hibernate state between taking readings of the sensor, wherein readings from the sensor arc stored in the non-volatile memory;
wherein multiple alarm states are set upon detecting multiple alarm conditions;
wherein at least one of the alarm conditions is based on historical data rather than instantaneous data.

37. A Radio Frequency Identification (RFID) tag, comprising:
a controller for setting an alarm state upon occurrence of an alarm condition;
at least one indicator selected from a group consisting of a tactile indicator, an audible output device, and a visual output device under control of the controller, the indicator providing an indication of the alarm condition when the alarm state is set; and
wherein the alarm state is set by the RFID tag if the RFID tag detects a signal from an RFID interrogator and the RFID tag does not receive a response from the RFD interrogator that the RFID tag was detected by the RFID interrogator.

38. An RFID tag as recited in claim 37, further comprising an activation circuit for waking the RFID tag from a low power hibernate state, and further comprising a sensor for detecting an environmental condition or a condition of an object to which attached, and further comprising non-volatile memory for storing several sensor readings, several indications of alarm conditions, and time data associated with at least the alarm conditions, the controller setting the Mann state based on an output of the sensor.

39. A Radio Frequency Identification (RFID) system, comprising:
a. plurality of RFID tags as recited in claim 37; and
an RFID interrogator in communication with the RFID tags.

40. A Radio Frequency Identification (RFD) tag, comprising:
an activation circuit for waking the RFID tag from a low power hibernate state;
a controller for setting an alarm state upon occurrence of an alarm condition;
a sensor for detecting an environmental condition or a condition of an object to which attached, the controller setting the alarm state based on an output of the sensor;
non-volatile memory for storing several sensor readings, several indications of alarm conditions, time data associated with at least one of the sensor readings and the alarm conditions, indications of the alarm states, and time data associated with the indications of the alarm states;
at least one of an audible output device, a. visual output device, and a tactile display device under control of the controller, the at least one output device providing an indicator of the alarm condition when the alarm state is set,
wherein the indicator of the alarm condition can only be reset by an authorized entity if the indicator of the alarm condition is resettable,
wherein the RFID tag enters the hibernate state between taking readings of the sensor.

41. A method for visually and electronically indicating occurrence of an alarm condition, the method comprising:
periodically exiting a hibernate state to detect data relating to an alarm condition;
storing the data in a non-volatile memory and at least one of a time and a date associated with the data, thereby generating historic data;
setting an alarm state upon determining occurrence of the alarm condition, wherein the determination of occurrence of the alarm condition is based on the historic data;
generating a visual indicator of the alarm condition based on the historic data, receiving an electronic query from an RFD interrogator;

in response to the electronic query from the RFID interrogator, transmitting an electronic indication of the alarm condition to the interrogator, wherein the visual indicator of the alarm condition can only be reset by an authorized entity.

42. A method as recited in claim 41, further comprising detecting an environmental condition or a condition of an object to which attached, and setting the alarm state based on an output of a sensor, wherein the alarm condition is based on a temporal amount of time that output or outputs of the sensor surpass a threshold.

43. A method as recited in claim 42, wherein the environmental condition is selected from a group consisting of temperature, humidity, Ph, sunlight, ultraviolet light, chemicals, radioactivity, pathogens, presence of bacteria, presence of viruses, presence of prions, carbon dioxide level, and combinations thereof.

44. A method as recited in claim 41, further comprising storing indications of multiple alarm states in the non-volatile memory and storing time and/or date data associated with the indications of the alarm states in the non-volatile memory.

45. A method as recited in claim 41, wherein the visual indicator remains displayed in the absence of power to a visual display device displaying the visual indicator.

46. A method as recited in claim 41, wherein the alarm condition is set when the RFID tag determines that it was not detected by an RFID interrogator.

47. A method as recited in claim 41, wherein the visual indicator is displayed by a mechanical display device.

48. A method as recited in claim 41, wherein the alarm condition is based on a presence of the RFID tag in a defined area as determined by the tag.

49. A method as recited in claim 41, wherein the interrogator detects the alarm condition and instructs an RFID tag to set the alarm state.

50. A Radio Frequency Identification (RFID) system, comprising:

a plurality of RE 11) tags, each tag performing the method of claim 41; and an RFID interrogator in communication with the RFID tags.

* * * * *